US006054189A

United States Patent [19]

Bravet et al.

[11] Patent Number: 6,054,189

[45] Date of Patent: Apr. 25, 2000

[54] PROCESS FOR PREPARING A SHEET OF PLASTIC, THIS SHEET AND GLAZING CONTAINING IT

[75] Inventors: Jean-Louis Bravet, Thourotte; Bernard Bureau, Marqueglise; Claude Didelot, Thourotte; Claude Morin, Puteaux, all of France

[73] Assignee: Saint-Gobain Vitrage, Courbevoie, France

[21] Appl. No.: 08/976,481

[22] Filed: Nov. 24, 1997

[30] Foreign Application Priority Data

Nov. 26, 1996 [FR] France .................................. 96 14403

[51] Int. Cl.[7] ............................... C08J 7/18; B05D 3/02; H05H 1/24

[52] U.S. Cl. ......................... 427/491; 427/489; 427/577; 427/541; 427/375; 427/376.2; 427/387; 427/397.7; 427/397.8; 427/385.5

[58] Field of Search .................................... 427/489, 491, 427/569, 577, 579, 375, 376.1, 376.2, 387, 397.7, 397.8, 385.5, 578, 541; 264/447, 448, 430, 478

[56] References Cited

U.S. PATENT DOCUMENTS

| | | | |
|---|---|---|---|
| 4,396,641 | 8/1983 | Imada et al. | 427/489 |
| 4,921,669 | 5/1990 | Vetter et al. | 264/134 |
| 4,940,602 | 7/1990 | Taniguchi et al. | 427/489 |
| 4,956,196 | 9/1990 | Wagner et al. | 427/489 |
| 5,051,308 | 9/1991 | Reed et al. | 427/489 |
| 5,156,882 | 10/1992 | Rzad et al. | 427/489 |
| 5,298,587 | 3/1994 | Hu et al. | 427/489 |
| 5,419,088 | 5/1995 | Raymond et al. | 52/1 |
| 5,700,576 | 12/1997 | Brehm et al. | 428/412 |
| 5,718,967 | 2/1998 | Hu et al. | 427/489 |

FOREIGN PATENT DOCUMENTS

| | | |
|---|---|---|
| 0 672 461 | 9/1995 | European Pat. Off. . |
| 0 718 348 | 6/1996 | European Pat. Off. . |
| 1.414.312 | 10/1965 | France . |

*Primary Examiner*—Marianne Padgett
*Attorney, Agent, or Firm*—Oblon, Spivak, McClelland, Maier & Neustadt, P.C.

[57] ABSTRACT

The present invention relates to a process for preparing a sheet of plastic coated with a hard varnish on at least part of at least one of its sides, including:

1) preparing a sheet of plastic by injection molding,
2) applying the varnish to the said sheet, and
3) heating the combination at a temperature at least equal to the softening point of the plastic of which the sheet is made, the varnish of at least a central part of the said combination being free of any mechanical contact other than that with the said sheet; the flat or curved transparent sheet thus obtained; its application as a motor-vehicle component containing a transparent part forming glazing and as motor-vehicle glazing.

14 Claims, No Drawings

PROCESS FOR PREPARING A SHEET OF PLASTIC, THIS SHEET AND GLAZING CONTAINING IT

BACKGROUND OF THE INVENTION

1. Field of the Invention

The present invention relates to the preparation of a sheet of plastic, in particular those intended for applications in which excellent transparency, or other optical properties, are required. This is the case, for example, with glazings in buildings or transportation vehicles, which could conceivably be replaced, at least in order to meet particular requirements, by sheets of plastic. The invention also relates to plastic sheets and glazings containing plastic sheets.

2. Discussion of the Background

Compared to glass, plastics are lighter—something which is a key advantage in urban vehicles powered by an electric motor insofar as an increase in their range is crucial. In such vehicles, it would even be conceivable to produce entire doors, or even whole sides of the bodywork, including the windows, from plastic, as a single unit, and then paint the bottom half, if desired. In general, making transparent surfaces lightweight is useful with regard to modern transportation vehicles insofar as technical progress goes hand in hand with incorporating ever more numerous functions into the glazing itself (rear-window heating, radio antenna, windscreen defrosting, tinting in order to prevent the passenger compartment from heating up in strong sunlight, incorporation of electrochromic compounds, display of information on the windscreen, etc.), and with using ever greater areas of glazing. This results in an increase in the overall weight of the vehicle, to the detriment of its energy consumption.

Moreover, compared to glass, plastics are capable of providing improved safety features and increased protection against theft, because of their superior toughness. A no less important advantage that plastics have over glass is their greater ability to be easily converted into complex shapes. Finally, the ability of sheets of plastic to be reversibly deformed to a greater or lesser extent makes it possible to envisage considerably simplified ways of fitting them into the bodywork openings, by means of snap-fastening, from the inside or from the outside of the vehicle.

In contrast, compared to glass, its relatively low rigidity mentioned above is obviously a handicap, as are its inferior transparency and optical properties and, above all, its greater scratchability.

Several approaches have hitherto been adopted in order to try to overcome this triple handicap.

According to a first approach, flat sheets of plastic are formed by extrusion, a piece is cut to the required dimensions and fixed to a thermoforming device, the thermoforming is carried out by contact with at least one solid mould surface and, optionally, using compressed air or suction. The optical properties of a sheet thus extruded are not satisfactory.

According to a second approach, the plastic is injection molded directly in a mold of suitable shape. The complexity of the manufacture of injection-molding devices is proportional to that of the shapes which it is desired to obtain; the cost of these devices feels the effect of this. In addition, this technique lacks flexibility in the sense that each component shape to be obtained requires the use of a special injection molding device. What is more, when substantially non-planar shapes, shapes which are more than just slightly curved, or which are complex in some other way are required, a non-uniform distribution of the material in the mold is observed, even when strictly conforming with the optimum operating conditions, such as the temperature/viscosity and pressure. This non-uniformity adversely affects the optical properties of the product.

According to both the above approaches, shaping is carried out by contact with a solid surface, generally made of metal. Of course, any imperfections in this solid surface are reproduced in the shaped plastic. Consequently, achieving good optical properties relies on an operation to polish the surface of the mold and/or of the molded component.

Moreover, the abovementioned scratchability of plastics is such that, in their optical application or as transparent elements, it is necessary to coat the shaped components with a hard varnish. This operation is accompanied, as is well-known to those skilled in the art, by problems of the varnish flaking off, problems which are all the more acute in the case of surfaces having complex shapes. In addition, it has only been envisaged to form the hard varnish at a temperature below the distortion temperature or softening point of the plastic, the shape of which is thus completely preserved throughout this operation. Such conditions for forming the varnish are excessively restrictive and have resulted in considerable effort being expended on producing varnishes which form at sufficiently low temperatures and, at the same time, producing thermoplastics having high softening points.

There is therefore still a need for a process for obtaining plastic components, in particular ones which are transparent or intended for optical applications, which would avoid the poor optical quality inherent in extrusion techniques or due to shaping components by contact with imperfect solid surfaces, to the non-uniform distribution of material in the injection mold, and to the problem of varnish flaking, and which would allow numerous varnishes to be used in combination with numerous plastics under satisfactory conditions of compatibility.

OBJECT OF THE INVENTION

These objectives are presently met by the invention, whose subject includes a process for preparing a sheet of plastic coated entirely or partly with a hard varnish, in which process the following steps are carried out in succession:

- preparing a sheet of plastic by injection molding,
- applying the varnish to the sheet, and
- heating the combination at a temperature at least equal to the softening point of the plastic of which the sheet is made, the varnish of at least a central part of the said combination being free of any mechanical contact other than that with the said sheet.

In the first place, the key benefits of injection molding as compared with extrusion in terms of optical properties are exploited here. Even more advantageous is the option, made possible by the invention, of heating the plastic in its softening range after applying the varnish. This enables the most diverse hard-varnish compounds, including the highest-performance compounds known to date, to be combined with numerous common thermoplastics which have relatively low softening points and which, at the end of the day, are inexpensive. It is known that treating the sheet, to which the varnish has been applied beforehand, at a relatively high temperature increases the adhesion of the final hard varnish and its abrasion resistance, with minimum loss of optical properties in the case of transparent sheets. The characteristic whereby this treatment takes place in the absence of any contact between the varnish of at least a central part of the sheet and a foreign element other than that with the sheet additionally guarantees that any optical properties are preserved to the maximum extent possible and prevents the formation of bubbles or of cracks while the varnish is curing.

In accordance with the present invention, the third step in the process, which consists in heating the said combination, may be carried out according to two main variants.

According to the first variant, at least a central part not coated with varnish of at least one side of the sheet of plastic is in contact with a surface capable of ensuring that the end-product has the required optical properties, in particular with a glass surface.

According to the second variant, the third step is carried out with at least a central part of the sheet coated with varnish being free of any mechanical contact, i.e. solely subject to the effect of gravity.

According to an excellent and particularly preferred embodiment, the sheet resulting from the injection-molding first step is substantially flat or slightly curved. This is because it is much easier to obtain a perfectly polished mold surface for such simple shapes, and the greater the surface area of the sheet, the more this holds true. Correspondingly, it is then easier to obtain transparent surfaces having good optical properties. Moreover, the first step of injection molding the sheet in a simple, almost flat shape guarantees that the material in the mold is distributed uniformly, which is also beneficial from the optical standpoint.

In addition it is, of course, easier to apply the varnish to an almost flat surface than to a surface having a more complex shape. Finally, in the case of transparent side components of transportation vehicles, the same injection mold can be used for manufacturing both offside components and nearside components, with plane shapes being produced in a first step, followed by a subsequent optional bending operation which can be preceded, if necessary, by an operation in which the component is turned upside down.

According to a preferred embodiment, the sheet of plastic coated at least partly with varnish is held, during the heating step in the softening range of the material, on a peripheral support and undergoes bending in a way similar to that commonly carried out in the case of glass.

Plastics which can be used to implement the invention are, for example, polycarbonate (PC), as obtained in particular from bisphenol A or from similar aromatic molecules, poly (methyl methacrylate) (PMMA), acrylic copolymers, ethylene copolymers such as ethylene/acrylic derivative (EAD) copolymers, or thermoplastic polyesters such as poly (ethylene terephthalate) (PET).

The process of the invention comprises two separate embodiments.

According to the first, the varnish is applied to the sheet of plastic in the form of a liquid precursor, then optionally dried for example by applying gentle heat and/or gentle radiation, before being cured in both cases by heating to a temperature at least equal to the softening point of the plastic. No flaking problems whatsoever can be observed. It may be assumed that the varnish, which becomes less liquid or more viscous as it cures, follows the shape of the sheet in the softened state, which gradually changes, where appropriate, until it takes on its desired final shape. Consequently, the use of the relatively high temperatures would, in addition to taking chemical reactions such as the condensation and polymerization of the varnish to completion, have the result of as it were, and according to this first variant, mechanically anchoring the varnish to its substrate while at the same time avoiding any cracking or any flaking of this varish.

Advantageously, in this case the hard varnish consists of networks of entangled inorganic and organic molecular chains connected together by means of silicon-carbon bonds. Such a hybrid varnish has excellent transparency, adhesion and scratch-resistant properties. It seems that the inorganic network gives the coating its hardness and its scratch resistance and the organic network gives it its elasticity and its toughness. Such varnishes are well-known and have been described in the published applications EP-A1-0,524,417 and EP-A1-0,718,348, the teachings of which are incorporated herein by reference; some of these varnishes are known under the registered trademark “Ormocer” which is an abbreviation for “Organically modified ceramic”.

As indicated above, this first embodiment seeks to make the curing temperature of the varnish coincide with the softening range of the plastic. In the case of Ormocers, the curing temperature can be readily adapted by varying the relative proportions of organic polymer fraction and inorganic fraction. As regards the plastic, certain constituents thereof are known to be able to affect the softening points. For example, the aforementioned application EP-A1-0,718,348 describes copolycarbonates obtained from bisphenol A and from diphenols functionalized by cycloalkyl groups, such as cyclohexyl: thus, the greater the fraction functionalized, the higher the softening points.

The liquid precursor of the varnish can be applied to the substrate by flow coating, by dipping, in particular in a bath of small volume for the sake of economy, by liquid spraying or curtain coating. The precursor consists, for example, of colloidal dispersions in solvents of several hybrid compounds, i.e. those which are both organic and inorganic, or a low-molecular-weight polymers functionalized by SiOR groups in a mixture of tetraethoxysilane. The curing of the varnish then takes place by a sol-gel process, in which the precursor is firstly dried, passing through the intermediate state of a gel, by gentle radiation or heating in particular, in the latter case at less than 50° C.; curing is completed by ultraviolet radiation or heating at temperatures greater than or equal to 140° C., preferably greater than or equal to 170° C. and more preferably still greater than or equal to 180° C., and preferably less than or equal to 240° C., more preferably less than or equal to 230° C. and more preferably still less than or equal to 200° C.

The addition to the varnish of UV stabilizers, sunscreens and/or colour pigments, of the usual types and in the usual proportions which are well-known to those skilled in the art, is particularly advantageous.

According to the second embodiment of the invention, the hard varnish is formed before the step in the process which consists in heating the plastic in the softening range.

Advantageously, this forming step is carried out cold and/or using plasma-assisted deposition, such as plasma CVD (Chemical Vapour Deposition). When the sheet subsequently undergoes bending on a peripheral support, it is advisable to choose the chemical composition of the varnish so that it is bendable. Under these conditions, any problem of flaking is easily avoided.

Preferably, the varnish used in this second embodiment is only inorganic and preferably consists, in particular, of polysiloxanes.

In accordance with the present invention, particularly remarkable results have been obtained using a varnish having a hardness gradient, more specifically having a hardness which increases from the sheet of plastic of which the substrate is made, towards the outside. This type of varnish has been built up by depositing successive layers of different compositions and/or by gradually varying the composition of a single layer of varnish during its deposition process. For the Ormocers mentioned above, an increase in the hardness corresponds to an increase in the proportion of inorganic chains relative to that of organic chains.

The technique of injection molding has many advantages which have not yet been mentioned and have given rise to other adaptations of the process of the invention.

Thus, according to an advantageous characteristic, an article consisting of a sheet provided with a peripheral overthickness, constituting a "rim", is formed during the injection molding. It is thus possible to maintain a predetermined rigidity while decreasing the thickness, i.e. where necessary achieving a reduction in weight and/or a saving in material.

Moreover, injection molding advantageously makes it possible to form, around the periphery of the sheet, a relief and/or extensions such as ribs, profiles, tabs or lugs, and/or to place one or more inserts, in particular metal inserts, within the plastic. This arrangement is particularly useful for gripping or fastening the sheet during its subsequent conversion operations, for example during the heating step, as well as for its intended final installation, such as in an opening in a motor-vehicle body. In the latter case, the formation of suitable peripheral profiles makes it possible to envisage installing the sheet from the inside of the vehicle, i.e. from the passenger compartment. The bead of adhesive is then placed under the edge of the bodywork opening and is not exposed to solar radiation. Needless to say, protecting the bead of adhesive by means of a varnish formed around the periphery of the internal side of the sheet then becomes superfluous.

The appendages formed around the periphery of the sheet during its injection molding may be preserved, or may be completely or partly sawn off, depending on their use. A sanding-down operation may be provided after such a sawing operation.

A peripheral profile having a geometry which is symmetrical with respect to the plane of the sheet may be appropriate, for example in the case of transparent side surfaces of transportation vehicles, with one or other part of the profile possibly being sawn off later, depending on whether it is an offside or nearside transparent component.

Moreover, optional inserts may be associated with incorporating special functions, such as a stoplight in a rear window, into the sheet.

The subject of the present invention is also a flat or curved transparent sheet based on a plastic, preferably polycarbonate, provided on at least part of at least one of its sides with a coating of hard varnish consisting of entangled inorganic and organic molecular chains connected together by silicon-carbon bonds, the sheet having been heated, after applying the varnish, or at the very least of a precursor of the latter, at a temperature at least equal to the softening point of the plastic, without there being any contact between at least a central part of the sheet and a foreign element.

Preferably, the thickness of the coating of hard varnish is greater than 3 μm, preferably greater than 5 μm. while still preferably remaining less than 10 μm, preferably less than 8 μm.

Moreover, the scope of the invention also extends to the application of the sheet described above as a motor-vehicle component containing a transparent part forming glazing and as motor-vehicle glazing, as well as its application to other structures where glazings are used.

The invention will now be illustrated by the following example.

EXAMPLE

The example in EP-A1-0,718,348 is reproduced on a sheet of polycarbonate which is prepared from bisphenol A. and not, in particular, from diphenols functionalized by cycloalkyl groups. This is a standard, unmodified polycarbonate, sold by Bayer AG under the registered trademark "Makrolon", the glass transition temperature Tg of which is equal to 145° C. The dimensions of the sheet are 105×150×3 mm. After drying the film of varnish, which is identical to that described in the prior application, also has a thickness of 5 μm.

The varnish is cured at a temperature of 155° C. for 30 min, the sheet being at the same time held on a peripheral support and deformed by bending.

The results of the tests on the adhesion of the film of varnish and on the abrasion resistance, by evaluating the opacification (ASTM F 735), are excellent, and comparable to those described in the example of the prior application in the case of the varnish being cured at 150° C. for 30 min.

The transparency and the optical quality of the sheet provided with its hard varnish are quite excellent, to a degree not yet achieved hitherto.

Equally remarkable results have been obtained on a sheet of copolycarbonate made from bisphenol A and 1,1-bis-(4-hydroxyphenyl)-3,3,5-trimethylcyclohexane, also sold by Bayer AG under the registered trademark "Apec HT", and having a glass transition temperature Tg equal to 185° C. The curing temperatures then rose to 230° C.

The optical quality and characteristics of coated sheets made according to the invention are superior to those provided by the prior art and, in particular, EP 718,348. This superior quality is believed to arise from the fact that in the present invention the varnish in the central portion of the sheet is preferably free of mechanical contact (other than contact with the sheet.)

French patent application 96/14403 is incorporated herein by reference.

What is claimed is:

1. A process for preparing a sheet of plastic coated with a cured varnish on at least a part thereof, comprising, in succession, the following steps:

(1) preparing the plastic sheet by injection molding, (2) applying a varnish to at least the part of the sheet to form a varnish coated sheet, and (3) heating the varnish coated sheet at a temperature at least equal to the softening point of the plastic of which the sheet is made, wherein the varnish on at least a first central part of said coated sheet is free of any mechanical contact other than that with said sheet, and wherein said temperature is greater than or equal to 140° C.

2. The process according to claim 1 wherein said varnish coated sheet further comprises a second central part not coated with said varnish, and wherein during the step (3), said second central part not coated with said varnish is in contact with a surface.

3. The process according to claim 1, wherein during the step (3) at least a third central part of said varnish coated sheet is free of any mechanical contact.

4. The process according to claim 1, wherein the sheet prepared in the step (1) is substantially flat or curved.

5. The process according to claim 4, wherein during the step (3), the plastic sheet is held on a peripheral support and undergoes bending.

6. The process according to claim 1, wherein the varnish is applied to the plastic sheet during the step (2) in the form of a liquid precursor, which is then dried, optionally at elevated temperature or under radiation, the varnish being finally cured during the step (3).

7. The process according to claim 6, wherein the curing temperature of the varnish coincides, at least partly, with the softening temperature of the plastic, at greater than or equal to 140° C. and less than or equal to 240° C.

8. The process according to claim 6, wherein the varnish contains UV stabilizers, sunscreens and/or color pigments.

9. The process according to claim 6, wherein the cured varnish consists of networks of entangled inorganic and organic molecular chains connected together by means of silicon-carbon bonds.

10. The process according to claim 1, wherein the cured varnish is formed prior to the step (3).

11. The process according to claim 10, wherein the cured varnish is formed using plasma-assisted deposition.

12. The process according to claim 11, wherein the cured varnish is an inorganic varnish.

13. The process according to claim 1, wherein the cured varnish has a hardness gradient which increases in a direction away from the plastic sheet, and wherein the hardness gradient is obtained by depositing successive layers of different compositions and/or by gradually varying the composition of a single layer of varnish during the deposition thereof.

14. The process according to claim 1, wherein the step (1) further comprises forming over-thicknesses for mechanical reinforcement and/or a relief and/or extensions around the periphery of the sheet and/or placing one or more inserts within the plastic sheet.

* * * * *